US010088588B2

(12) United States Patent
Zhang et al.

(10) Patent No.: US 10,088,588 B2
(45) Date of Patent: Oct. 2, 2018

(54) DEVICE AND METHOD FOR STABLE LEAST-SQUARES REVERSE TIME MIGRATION

(71) Applicant: CGG SERVICES SA, Massy (FR)

(72) Inventors: Yu Zhang, Crawley (GB); Lian Duan, Crawley (GB); Yi Xie, Singapore (SG)

(73) Assignee: CGG SERVICES SAS, Massy (FR)

( * ) Notice: Subject to any disclaimer, the term of this patent is extended or adjusted under 35 U.S.C. 154(b) by 671 days.

(21) Appl. No.: 14/071,716

(22) Filed: Nov. 5, 2013

(65) Prior Publication Data
US 2014/0301158 A1  Oct. 9, 2014

Related U.S. Application Data

(60) Provisional application No. 61/807,950, filed on Apr. 3, 2013.

(51) Int. Cl.
*G01V 1/34* (2006.01)
*G01V 1/30* (2006.01)

(52) U.S. Cl.
CPC ............... *G01V 1/34* (2013.01); *G01V 1/301* (2013.01); *G01V 2210/675* (2013.01); *G01V 2210/679* (2013.01)

(58) Field of Classification Search
CPC .... G01V 1/34; G01V 1/301; G01V 2210/675; G01V 2210/679
USPC .......................................................... 367/37
See application file for complete search history.

(56) References Cited

U.S. PATENT DOCUMENTS

| | | | | |
|---|---|---|---|---|
| 2005/0075791 A1* | 4/2005 | Lailly | ...................... | G01V 1/34 702/17 |
| 2010/0018718 A1* | 1/2010 | Krebs | ...................... | G01V 1/28 166/369 |
| 2011/0288831 A1* | 11/2011 | Tan | ...................... | G01V 1/282 703/2 |
| 2011/0305109 A1* | 12/2011 | Soubaras | ................. | G01V 1/28 367/24 |
| 2013/0028052 A1* | 1/2013 | Routh | ...................... | G01V 1/28 367/43 |
| 2013/0238246 A1* | 9/2013 | Krebs | .................... | G01V 1/005 702/14 |
| 2013/0294196 A1* | 11/2013 | Childs | .................... | G01V 1/301 367/46 |

(Continued)

OTHER PUBLICATIONS

S. Dong, et al., "Least-Squares Reverse Time Migration: Towards True Amplitude Imaging and Improving the Resolution", SEG Las Vegas 2012 Annual Meeting.*

(Continued)

*Primary Examiner* — Ian J Lobo
(74) *Attorney, Agent, or Firm* — Patent Portfolio Builders PLLC

(57) ABSTRACT

There is a method for generating a final image of a subsurface of the earth. The method includes receiving measured seismic data d of the subsurface; selecting an objective function E that is function of a reflectivity r of the subsurface; and calculating, in a processor, the reflectivity r based on the measured seismic data d, the objective function E, simulated data $\tilde{d}$, a modeling operator M from a reverse time demigration (RTDM) process and an imaging operator $M^T$ from a reverse time migration (RTM) process.

13 Claims, 13 Drawing Sheets

(56) References Cited

U.S. PATENT DOCUMENTS

| | | | |
|---|---|---|---|
| 2013/0311149 A1* | 11/2013 | Tang | G06F 17/50 703/2 |
| 2014/0358504 A1* | 12/2014 | Baumstein | G01V 99/005 703/2 |
| 2014/0372044 A1* | 12/2014 | Jiao | G01V 1/282 702/16 |

OTHER PUBLICATIONS

Changsoo, Shin, et al. "Evaluation of poststack migration in terms of virtual source and partial derivative wavefields." Journal of Seismic Exploration 12.1737 (2003): 17.*

Extended European Search Report in corresponding European Patent Application No. EP 14 114 16 2720, dated Jul. 29, 2015. (4 of the NPL references were submitted with IDS filed on Nov. 5, 2013.).

Paffenholz, et al.; "Subsalt multiple attenuation and imaging: Observations from the Sigsbee2B synthetic dataset"; 72nd Annual International Meeting, SEG, Expanded Abstracts; 2002, pp. 1-4; XP002742117.

S. Dong, et al., "Least-Squares Reverse Time Migration: Towards True Amplitude Imaging and Improving the Resolution", SEG Las Vegas 2012 Annual Meeting, 5 pgs.

S. Xu, et al., "3D Angle Gathers from Reverse Time Migration", GEOPHYSICS, Mar.-Apr. 2011, pp. S77-S92, vol. 76, No. 2.

G. Yao, et al., "Least-Squares Reverse-Time Migration", SEG Las Vegas 2012 Annual Meeting, 5 pgs.

Y. Zhang, et al., "Practical Issues in Reverse Time Migration: True Amplitude Gathers, Noise Removal and Harmonic Source Encoding", First Break, Jan. 2009, pp. 29-35, vol. 26.

Y. Zang, et al., "Predicting Multiples Using a Reverse Time Demigration", SEG Las Vegas 2012 Annual Meeting, 5 pgs.

Examination Report No. 1 in corresponding Australian Application No. 2014201896 dated Sep. 20, 2017.

Y. Zhang, et al.; "Predicting multiples using a reverse time demigration"; 83rd Annual International Meeting, SEG, Expanded Abstracts, 2012; pp. 1-5.

European Office Action, dated Jul. 13, 2018, from corresponding EP Application No. 14 162 720.8-1003.

* cited by examiner

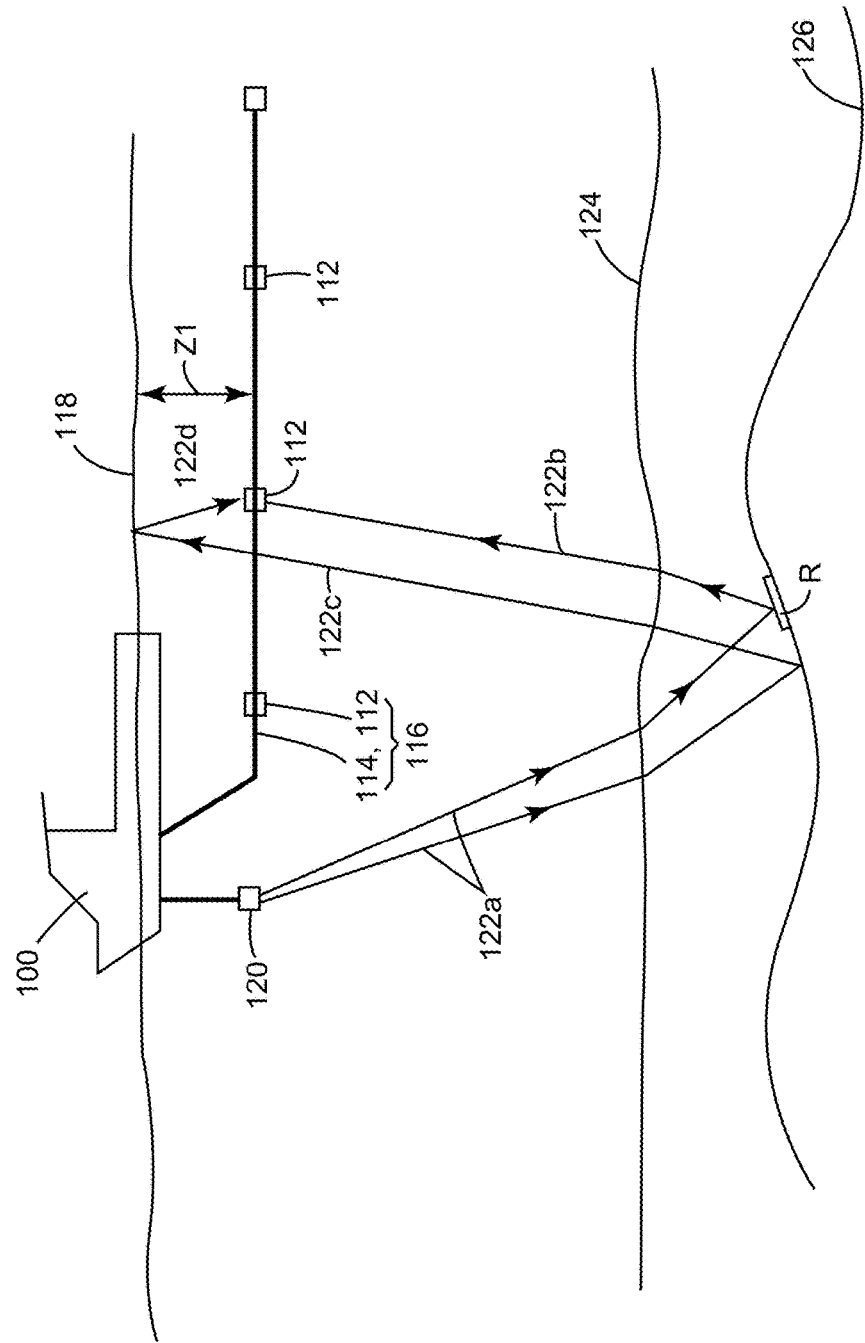

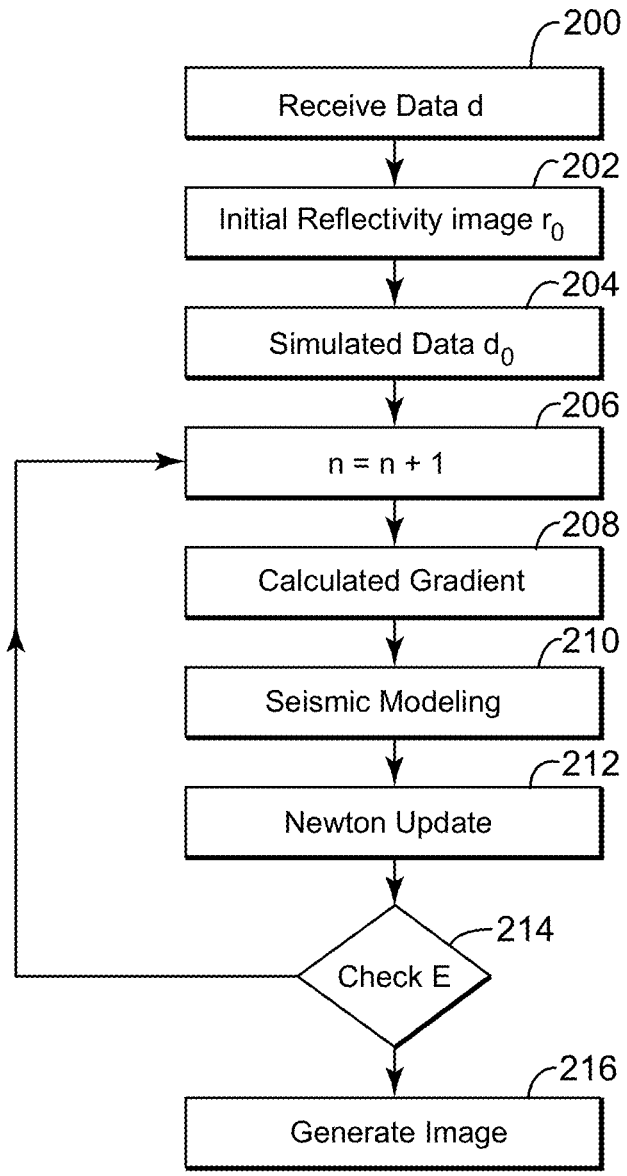

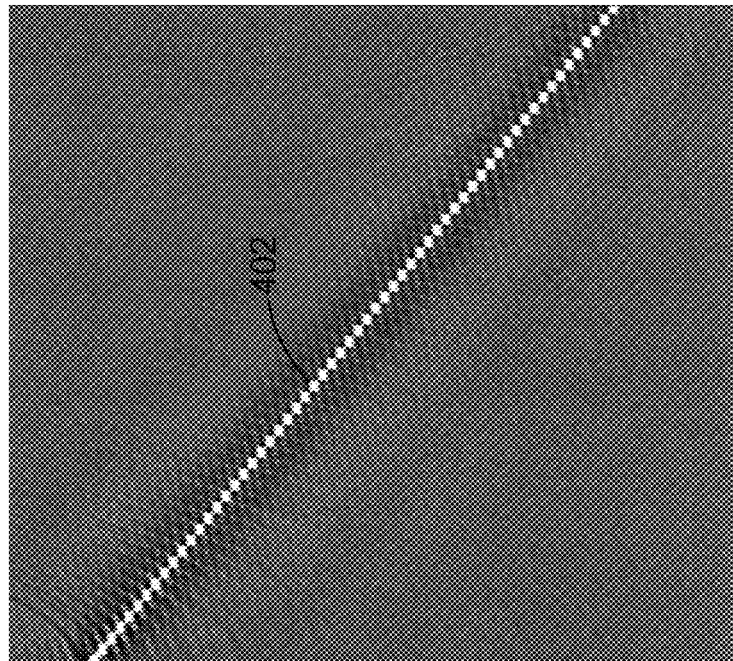
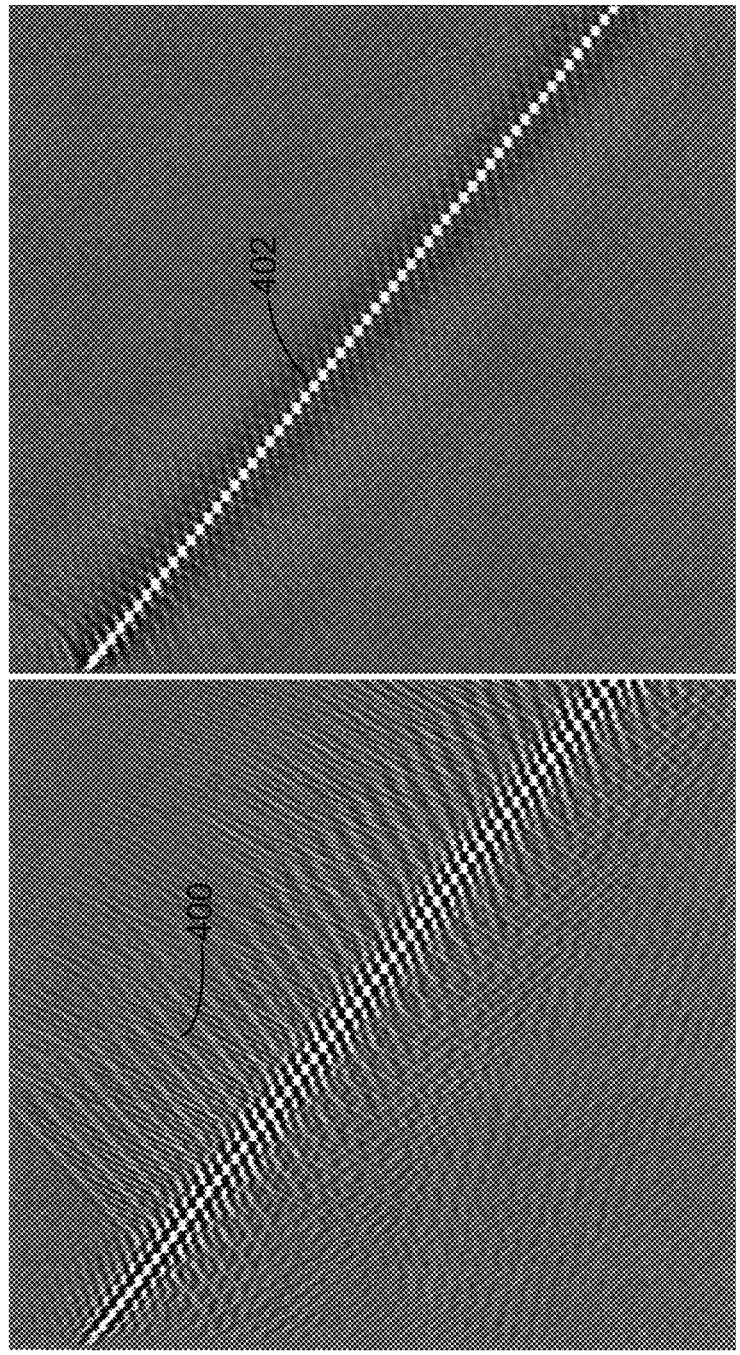

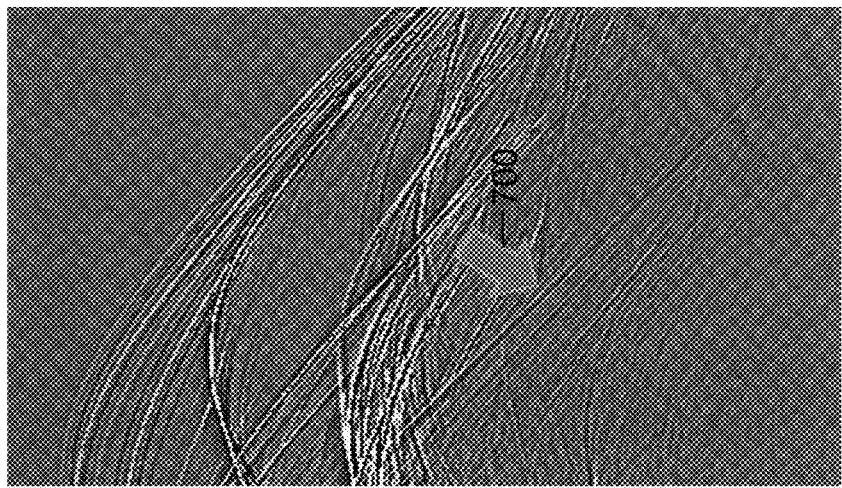
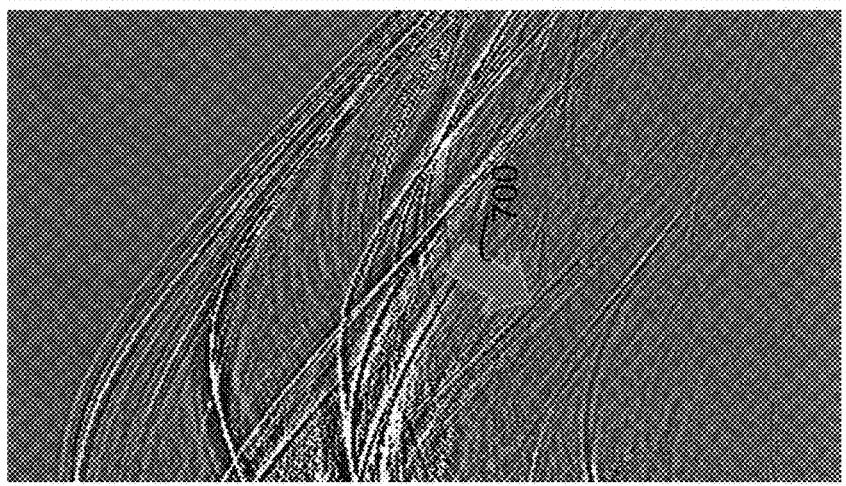

DEVICE AND METHOD FOR STABLE LEAST-SQUARES REVERSE TIME MIGRATION

CROSS REFERENCE TO RELATED APPLICATIONS

This application claims priority and benefit from U.S. Provisional Patent Application No. 61/807,950, filed Apr. 3, 2013, for "A STABLE AND PRACTICAL IMPLEMENTATION OF LEAST-SQUARES REVERSE TIME MIGRATION," the entire contents of which are incorporated in their entirety herein by reference.

BACKGROUND

Technical Field

Embodiments of the subject matter disclosed herein generally relate to methods and systems and, more particularly, to mechanisms and techniques for providing high-quality images of a surveyed subsurface, with balanced amplitudes, improved focusing and enhanced resolution.

Discussion of the Background

Marine seismic data acquisition and processing generate a profile (image) of the geophysical structure under the seafloor. While this profile does not provide an accurate location for oil and gas reservoirs, it suggests, to those trained in the field, the presence or absence of them. Thus, providing a high-resolution image of the structures under the seafloor is an ongoing process.

During a seismic gathering process, as shown in FIG. 1, a vessel 100 tows an array of seismic detectors 112 provided along cables 114. The detectors and cables form streamers 116. Streamers 116 may be disposed horizontally, i.e., lie at a constant depth z1 relative to the surface 118 of the ocean, or they may be tilted in relation to this surface. Vessel 100 also tows a sound source 120 configured to generate an acoustic wave 122a. Acoustic wave 122a propagates downward, toward seafloor 124, and penetrates it until eventually a reflecting structure 126 (reflector) reflects the acoustic wave. The reflected acoustic wave 122b propagates upward until it is detected by detector 112. The recorded data is then processed to produce an accurate image of the subsurface.

Processing includes various phases, e.g., velocity model determination, pre-stack, migration, post-stack, etc., which are known in the art, so their description is omitted herein. Progress in pre-stack depth imaging has been considerable in the past. Theoretical progress has provided better methods for extrapolating wavefields measured at the earth's surface into the subsurface, and practical progress has linked the migrations more closely with velocity model-building and interpretation. Migration is the process of propagating, for example, a wavefield measured at a receiver location to a reflector located in the subsurface. Migration may also be applied to wavefields generated by a source.

Initial migration methods (Kirchhoff and beam) relied on rays to approximate the Green's functions for wave propagation. More accurate methods rely on the so-called wave-equation migration algorithms that use full waveform Green's functions. The most computationally efficient algorithms for doing this are collectively called one-way wave equation migration (OWEM). These algorithms decompose seismic wavefields inside the earth into up-going waves and down-going waves under the assumption of no interaction between these two wavefields; that is, no turning wave and vertical reflection generation during the synthesis of wave propagation.

Use of the two-way wave equation in depth migration began some time ago in an algorithm called reverse-time migration (RTM), see, for example, Zhang and Sun, 2009, "Practical issues of reverse time migration: true-amplitude gathers, noise removal and harmonic-source encoding," First Break, Vol. 26, 19-25, and Xu et al., 2011, "3D angle gathers from reverse time migration," Geophysics, Vol. 76, No. 2, S77-S92, the entire contents of which are incorporated herein by reference.

However, this approach was limited due to its need for computer power. With increases in computer power, RTM has developed rapidly over the last few years, and theoretical advantages such as dip-unlimited accurate wave propagation and improved amplitudes have provided imaging benefits in practice. For example, in complex subsalt and salt flank areas, the numerical Green's functions from finite difference to the two-way wave equation have better amplitude behavior, so it is easier to incorporate amplitude corrections into RTM than into OWEM. In addition to its ability to handle complex velocities distributions, many current RTM algorithms can handle anisotropic media such as vertical transverse isotropy (VTI) and tilted transverse isotropy (TTI).

One of the most common RTM imaging conditions is cross-correlation of the forward propagated source wavefield with the backward propagated receiver wavefield. However, the image contains amplitude distortions caused by RTM crosstalk artifacts. An inversion-based least-squares migration (LSM) scheme has been shown to noticeably reduce migration artifacts and improve lateral spatial resolution. LSM iteratively seeks a final image which best matches the amplitude of simulated and recorded seismic data. This final image is thus called the inverted image. However, the forward modeling and migration engine for the LSM scheme were in the past the Kirchhoff migration, which suffers from the limitations noted above. Recently, one-wave wave equation and two-way RTM were used as the modeling and migration engine.

More recently, true-amplitude RTM became the state-of-the-art technology for imaging and interpreting subtle and complex geologic features, while its conjugate process, reverse-time demigration (RTDM) (see, for example, Zhang and Duan, 2012, "Predicting multiples using a reverse time demigration," $83^{rd}$ Annual International Meeting, SEG, Expanded Abstracts, 520-524, the entire content of which is incorporated herein by reference), has become a novel technique to predict primary, interbed and surface-related multiples and free surface ghosts for a variety of acquisition geometries. Demigration is considered the inverse of the adjoint process of migration. Demigration uses reflectivity to predict seismic data. Both techniques, RTM and RTDM, take advantage of a complete set of acoustic waves (reflections, transmissions, diffractions, prismatic waves, etc.), correctly handle complex velocities, and propagate waves without angle limitations. For these reasons, RTM and RTDM are desirable as the imaging and modeling operators in least-squares RTM (LSRTM). The modeling uses velocity and density as the input models.

However, it is not an easy task to directly apply conventional amplitude-matching-based LSRTM to real datasets because the earth is a visco-elastic medium with density variations, much more complicated than the models used to propagate acoustic wavefields in seismic imaging. As a result, amplitude matching is never perfect. Also, it is difficult to define a good source signature in the modeling. The challenge of determining source strength, which can vary from source to source, is even greater. All these practical issues require considerable effort in preprocessing both the observed and simulated data to correctly use the conventional LSRTM formulation.

Thus, it is desirable to introduce a new general framework of LSRTM that avoids the above-noted problems and relaxes the amplitude constraints of existing LSRTM.

SUMMARY

According to one exemplary embodiment, there is a method for generating a final image of a subsurface of the earth. The method includes receiving measured seismic data d of the subsurface; selecting an objective function E that is function of a reflectivity r of the subsurface, wherein the objective function E includes a term that cross-correlates the measured seismic data d and simulated data $\bar{d}$ at zero lag; calculating the reflectivity r based on the measured seismic data d, objective function E, and simulated data $\bar{d}$; and generating the final image based on reflectivity r.

According to another embodiment, there is a method for generating a final image of a subsurface of the earth. The method includes receiving measured seismic data d of the subsurface; selecting an objective function E that is function of a reflectivity r of the subsurface, wherein the objective function E includes a term that cross-correlates the measured seismic data d and simulated data $\bar{d}$ at zero lag; and calculating, in a processor, the reflectivity r based on the measured seismic data d, objective function E, simulated data $\bar{d}$, a modeling operator M from a reverse time demigration (RTDM) process and an imaging operator $M^T$ from a reverse time migration (RTM) process.

According to still another exemplary embodiment, there is a method for generating a final image of a subsurface of the earth. The method includes receiving measured seismic data d of the subsurface; selecting an objective function E that is function of a reflectivity r of the subsurface; and calculating, in a processor, the reflectivity r based on the measured seismic data d, the objective function E, simulated data $\bar{d}$, a modeling operator M from a reverse time demigration (RTDM) process and an imaging operator $M^T$ from a reverse time migration (RTM) process.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 is a schematic diagram of a conventional data acquisition setup;

FIG. 2 is a flowchart of a correlative least-squares RTM method;

FIG. 4A is an image of a surveyed subsurface obtained by applying an RTM algorithm;

FIG. 4B is an image of the surveyed subsurface obtained by applying the correlative least-squares RTM algorithm;

FIG. 7A illustrates an initial simulated shot record, FIG. 7B illustrates the same shot location calculated with the correlative least-squares RTM, and FIG. 7C illustrates the same shot location based on the recorded seismic data;

FIG. 8A illustrates an image of a simulated subsurface using the RTM method, FIG. 8B illustrates the same subsurface using the correlative least-squares RTM, and FIG. 8C illustrates the same subsurface using a stratigraphic velocity;

DETAILED DESCRIPTION

Figure 3A:
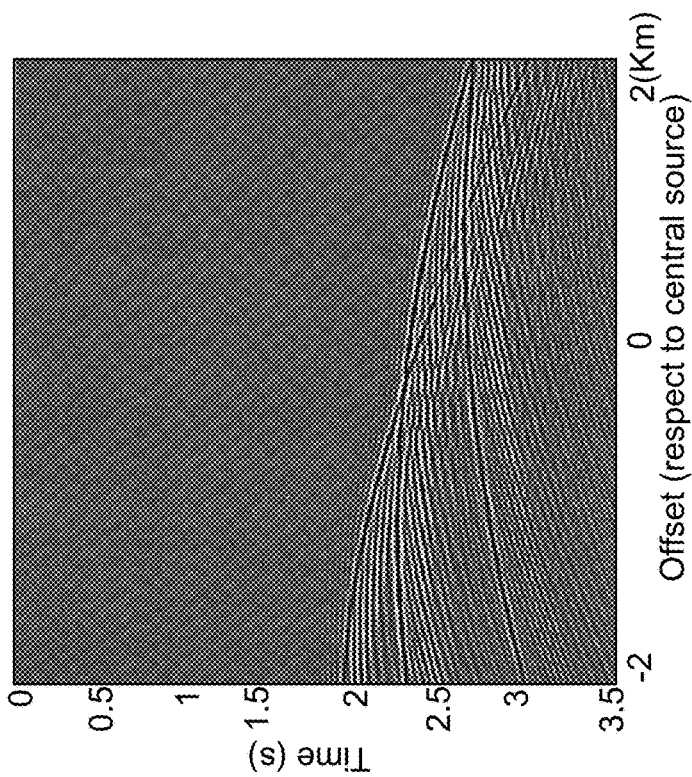
FIG. 3A is a graph illustrating an exact density model.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of source wavefields, receiver wavefields, RTM, RTDM and LSM methods in the context of marine seismic data processing. However, the embodiments to be discussed next are not limited to marine seismic data or RTM and RTDM methods, but may be applied to other type of data, e.g., seismic land data and/or other methods and operators, e.g., Kirchhoff.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a new general framework of LSRTM is introduced and is based on maximizing a cross-correlation of simulated and observed seismic data at zero lag. The new method relaxes the amplitude constraints and, thus, it can be applied to actual data and shows improved stability performance compared to LSRTM. The new method is called correlative least-squares RTM (CLSRTM). To improve numerical convergence, a Newton's method may be applied to solve it. However, other mathematical algorithms may be applied. Both synthetic and real numerical results (presented later) show that CLSRTM leads to improved image quality, revealing more structural detail in areas of poor illumination and imaging.

Before discussing the details of the CLSRTM method, a few general seismic concepts are introduced to facilitate understanding of the new method. If the simulated seismic data is $\bar{d}$ and the reflectivity model is m, a forward modeling operator L connects the seismic data to the reflectivity model as described by equation (1):

$$\bar{d}=Lm. \tag{1}$$

The migration operator is the adjoint of the forward modeling operator L and can be represented by:

$$m_{mig}=L^T\bar{d}, \tag{2}$$

where $m_{mig}$ is the migration image. To obtain a better reflectivity image, a least-squares inversion problem may be used, i.e., an objective function O(m) may be defined as the least-squares difference between the forward modeled data Lm and the recorded data d:

$$O(m) = \|Lm - d\|. \quad (3)$$

Note that after calculating a source wavefield $P_S$ (originating at the source location) and a receiver wavefield $P_R$ (recorded at the receivers) with the RTM method, the angle-dependent reflectivity r, at a subsurface reflection point $\vec{x}$, is given by $r(\vec{x}; \theta) = \int P_R(\vec{x}, t)/P_S(\vec{x}, t)\, dt$, and the stacked image I can be expressed as $I(\vec{x}) = \iint P_R(\vec{x}, t)/P_S(\vec{x}, t) dt d\theta$.

With this general background in mind, the novel method is now discussed. To simplify presentation of the CLSRTM method, it is assumed that the earth is an isotropic medium. However, note that the novel method is also applicable to a non-isotropic earth. With this assumption, a wavefield $P(\vec{x}; t)$ can be modeled by the acoustic wave equation as follows:

$$\begin{cases} \left(\frac{1}{v^2}\frac{\partial^2}{\partial t^2} - \rho \nabla \cdot \left(\frac{1}{\rho}\nabla\right)\right) P(\vec{x}; t) = \delta(\vec{x} - \vec{x}_s) f(t), & (4a) \\ d(\vec{x}_s; \vec{x}_r; t) = P(\vec{x}_r; t), & (4b) \end{cases}$$

where f(t) is the source signature, $v(\vec{x})$ is the velocity of the medium, $\rho(\vec{x})$ is the medium's density, $$\nabla = \left(\frac{\partial}{\partial x}, \frac{\partial}{\partial y}, \frac{\partial}{\partial z}\right)$$

is the gradient operator, and d denotes the seismic data recorded at receiver locations $\vec{x}_r$ due to specified source location $\vec{x}_s$.

In RTDM, which is described below by equations (5a-c), the aim is to reconstruct the wavefield recorded at the receivers based on a given stacked image $I(\vec{x})$, migration velocity $v(\vec{x})$ and source location $\vec{x}_s$. For example, it is possible to predict the recorded seismic data from the stacked image, or reflectivity model $r(\vec{x})$, using the following partial differential equations:

$$\begin{cases} \left(\frac{1}{\tilde{v}^2}\frac{\partial^2}{\partial t^2} - \nabla^2\right) P_S(\vec{x}; t) = \delta(\vec{x} - \vec{x}_s)\tilde{f}(t), & (5a) \\ \left(\frac{1}{\tilde{v}^2}\frac{\partial^2}{\partial t^2} - \nabla^2\right) P_R(\vec{x}; t) = r(\vec{x}) P_S(\vec{x}; t), & (5b) \\ \tilde{d}(\vec{x}_s; \vec{x}_r; t) = P_R(\vec{x}_r; t), & (5c) \end{cases}$$

with $P_R$ being the receiver wavefield, $P_S$ being the source wavefield and $\tilde{d}$ being the estimated seismic data.

Note that receiver wavefield $P_R(\vec{x}; t)$ propagates only waves generated by fictitious sources that result from the multiplication of source wavefield $P_S(\vec{x}; t)$ and reflectivity $r(\vec{x})$ in equation (5b).

The LSRTM method tries to match simulated data $\tilde{d}$ (obtained in equation 5c) with observed (measured) data d. Even in the ideal situation where the exact velocity and source information are known, e.g., $\tilde{v} = v$ and $\tilde{f} = f$, the RTDM (described by equations (5a-c) above) and the RTM (described by equations (4a-b) above) produce different propagation amplitudes. When the source information is absent or the demigration velocity is inexact, the data matching step using only the amplitude information becomes even more challenging.

Thus, LSRTM suffers because of the rigid amplitude matching condition. An alternative approach to LSRTM is to relax the amplitude matching condition and to measure the closeness between the simulated data and the seismic data. To evaluate the above-noted closeness, a cross-correlation-based objective function E may be introduced. This novel objective function alleviates the rigid amplitude matching step in LSRTM. For example, in one embodiment, in the time domain, cross-correlation-based objective function E may take the form:

$$E(r) = -\iiint \frac{Mr \cdot d}{\sqrt{\int (Mr)^2 dt}\sqrt{\int d^2 dt}} dt d\hat{x}_s d\hat{x}_r, \quad (6)$$

where M is the modeling operator from RTDM, Mr (or $\tilde{d}$) is the modeled seismic data, and the negative sign on the right-hand side of the equal sign is introduced so the optimal solution is achieved when objective function E(r) reaches its minimum (or maximum). In one application, objective function E is an integral of the cross-correlation between the modeled seismic data Mr and the reflectivity model r over the source and sensors' positions. Note that objective function E is a function of reflectivity model r.

In CLSRTM, the velocity model, which is embedded in modeling operator M, is assumed to be corrected or already optimized. Note that the value of E(r) is unchanged by rescaling modeled seismic data Mr. Therefore, the exact overall scaling of the source strength can be ignored in CLSRTM, which is an advantage over existing algorithms.

The CLSRTM method finds an optimal image r which maximizes the cross-correlation between seismic data d and simulated data Mr at zero lag, or equivalently, minimizes objective function E. If the two datasets d and Mr are identical or different by a constant scaling, the objective function reaches its minimum at −1. A numerical solution can be found, for example, using Newton's method, which uses the gradient and Hessian of the objective function. A small perturbation of the reflectivity image δr may be applied to objective function E, as follows:

$$E(r + \delta r) - E(r) = \iiint \frac{1}{\|d\|}\left(\frac{Mr \cdot d}{\|Mr\|} - \frac{M(r + \delta r) \cdot d}{\|M(r + \delta r)\|}\right) dt d\hat{x}_s d\hat{x}_r \quad (7)$$

where $\|\cdot\|$ is the $L_2$ norm. Applying a Taylor expansion, the gradient is found to be given by:

$$\frac{dE}{d(M\delta r)} = \frac{1}{\|d\|\|Mr\|}\left(\frac{\int Mr \cdot d\, dt}{\|Mr\|^2} Mr - d\right), \quad (8)$$

and the Hessian is given by:

$$\frac{d^2E}{d(M\delta r)^2} = \frac{1}{2} \frac{\int Mr \cdot d \, dt}{\|d\| \|Mr\|^3} \left(1 - \frac{(Mr)^2}{\|Mr\|^2}\right) - \frac{Mr}{\|Mr\|^2} \frac{dE}{d(M\delta r)}. \quad (9)$$

Simulated data $\tilde{d}$ and actual data d are then matched using the gradient calculated in equation (8) and the Hessian calculated in equation (9). A flowchart of the CLSRTM method is now discussed with respect to FIG. 2.

In step 200 of FIG. 2, recorded data d is received. This data may be recorded using a marine or land seismic acquisition system. In step 202, an initial reflectivity image $r_0$ is assumed to be known. Simulated initial data $d_0 = Mr_0$ is calculated in step 204, for example, using the RTM algorithm. Then, an iteration index "n" is initiated and an iterative process is started in step 206, followed by the calculation in step 208 of the gradient direction $\delta r_i$ in the image domain based on equation:

$$\delta r_i = M^T \left[ \left(\frac{d^2E}{d(M\delta r_i)^2}\right)^{-1} \frac{dE}{d(M\delta r_i)} \right], \quad (10)$$

where "T" stands for the transpose operation and $M^T$ is the RTM imaging operator.

Next, the process advances to step 210, in which is performed seismic modeling M of the gradient direction $\delta r_i$:

$$\delta d_i = M \delta r_i \quad (11)$$

A Newton algorithm is applied in step 212 on simulated seismic data using equation:

$$d_i = d_{i-1} - \alpha \delta d_i \quad (12)$$

and on the inverted image using equation:

$$r_i = r_{i-1} - \alpha \delta r_i \quad (13)$$

where scalar $\alpha$ is found by minimizing objective function E using a linear searching method. In step 214, objective function E and a stopping criterion are checked, for example, against a predetermined value. For example, the predetermined value may be −0.9 and the stopping criterion is whether E is smaller than −0.9. Other values for the predetermined value may be selected, based, for example, on the nature, conditions, and goals of the survey. For example, if a salt or chalk region is expected to cover the surveyed subsurface, this value may be changed. If the stopping criterion is met, then the process returns to step 206 and repeats steps 206-214 discussed above. Otherwise, the process generates optimal image r in step 216.

Figure 3B:
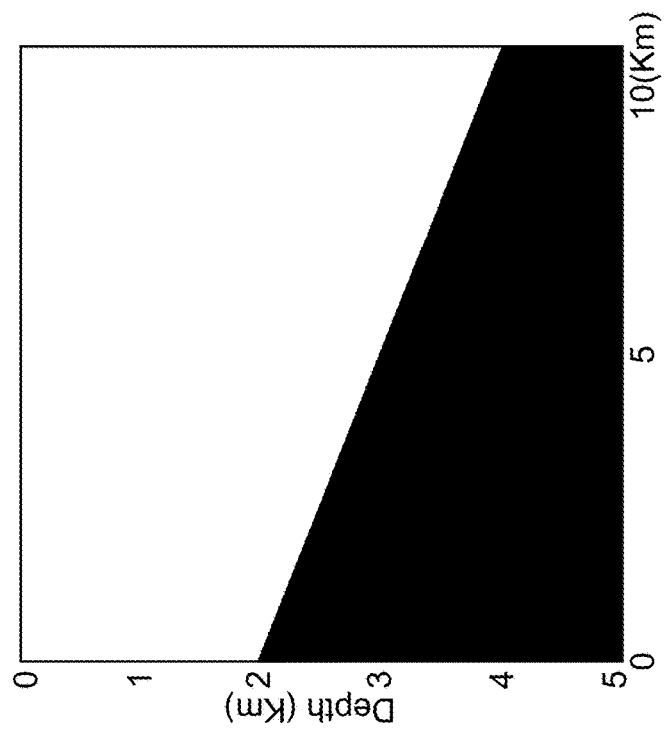
FIG. 3B is a shot record of simultaneous shooting.

The above-discussed method is now applied to a set of synthetic data and then to a set of real data for illustrating its power. For the synthetic data, consider the situation in which three identical sources are shooting simultaneously, i.e., they are firing at the same time with source depth of 12.5 m and source separations of 1 km. Streamer cables are towed in between these three sources at the same depth, and both shot and receiver ghosts are recorded. Setting the background velocity to 2 km/s and the density model to contain a dipping reflector as illustrated in FIG. 3A, an acoustic modeling code is used to generate the seismic data. In CLSRTM, knowledge is assumed of the source wavelet and the use of RTDM to simulate seismic data with ghosts as illustrated in FIG. 3B. FIG. 4A illustrates the inverted image obtained using a conventional RTM method that includes migration artifacts and crosstalk noise 400, while FIG. 4B illustrates the inverted image at the end of iteration n=20 (see FIG. 2, step 206) of the CLSRTM method. Migration artifacts and crosstalk noise 400 associated with multiple sources are suppressed in FIG. 4B, and wavelet 402 at the dipping reflector is better focused and appears much sharper compared with the initial RTM image (FIG. 4A) using the same recorded data.

Figure 6:
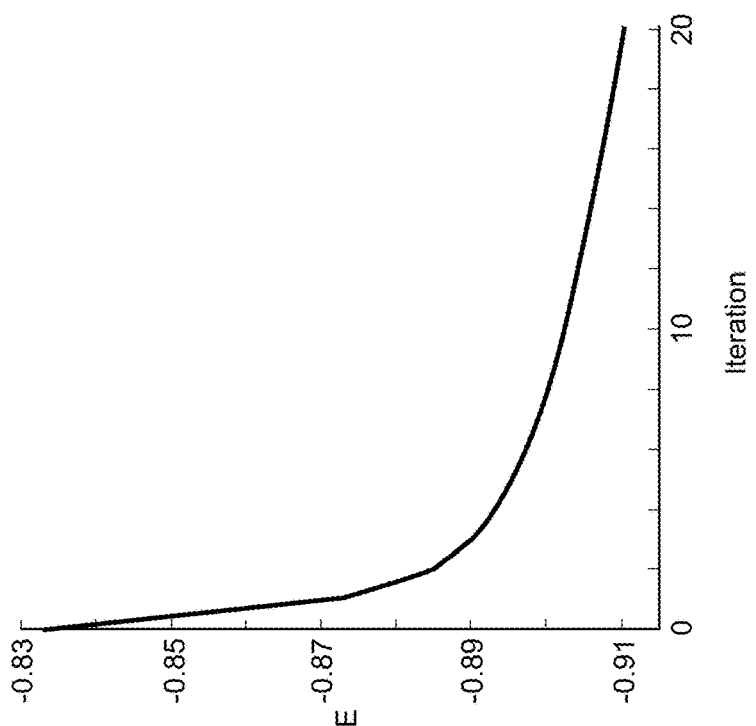
FIG. 6 illustrates the value of an objective function as a function of a number of iterations.
Figure 5:
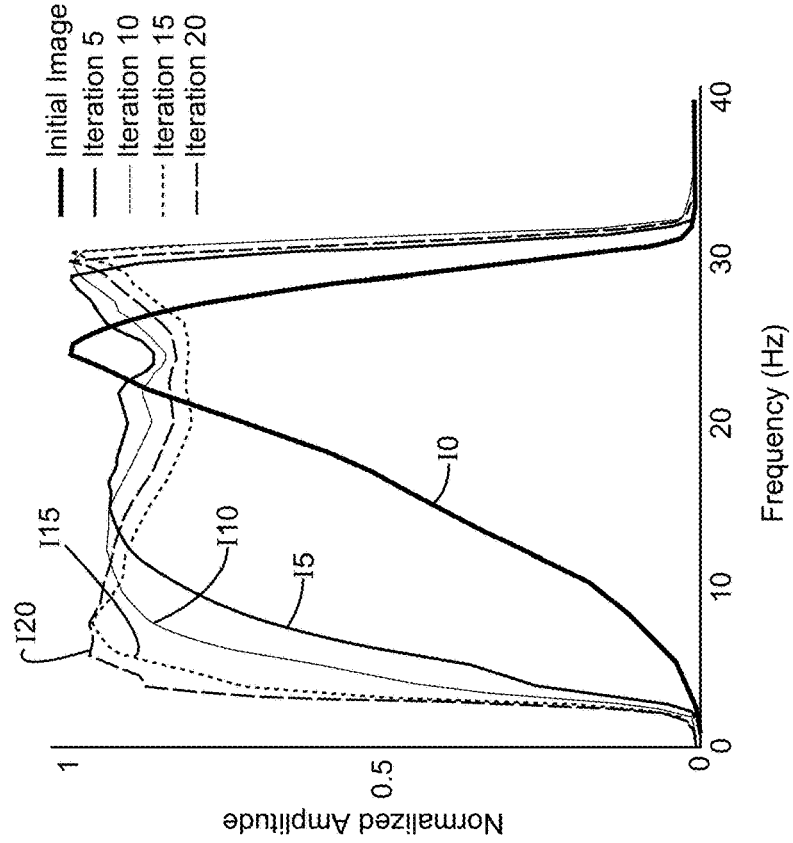
FIG. 5 illustrates frequency spectrum variations of a dipping reflector.

This side-by-side comparison of the inverted image obtained with the traditional RTM method and the new CLSRTM method shows that CLSRTM gradually removes ghost effects over the iterations and gives wider and more balanced frequency bandwidth. FIG. 5 shows the frequency spectrum of the inverted amplitudes on the dipping reflector for every $5^{th}$ iteration (I0 is the initial image, I5 corresponds to the $5^{th}$ iteration, I10 corresponds to the $10^{th}$ iteration, I15 corresponds to the $15^{th}$ iteration and I20 corresponds to the $20^{th}$ iteration), and FIG. 6 shows the numerical value of objective function E for every iteration during the 20 iterations. While the amplitude spectra indicate a gradual deghosting process over the iterations, converging to the correct solution with flat spectrum from 0 to 32 Hz, the value of the objective function decreases rapidly for the first several iterations, and then steadily improves for the later iterations.

Next, another synthetic example is processed with the CLSRTM method. This example includes the 2D synthetic data set Sigsbee2A disclosed in Paffenholz et al., 2002, "Subsalt multiple attenuation and imaging: Observations from the Sigsbee2B synthetic dataset," 72nd Annual International Meeting, SEG, Expanded Abstracts, 2122-2125, the entire content of which is included herein by reference.

The seismic data is generated using a (fine) stratigraphic velocity model, with 50 m shot spacing, 25 m receiver spacing and 8,500 m maximum offset. Both source and receiver ghosts are recorded at 8.5 m depth. The seismic data is first migrated using the (smoothed) migration velocity. As illustrated in FIG. 7A, the initial simulated data does not match well the actual seismic data illustrated in FIG. 7C, due to acquisition limitations and the imperfection of the imaging operator. However, over a number of iterations of the CLSRTM method, the simulated data illustrated in FIG. 7B gradually approaches the actual seismic data of FIG. 7C. For example, in FIGS. 7A-C, some reflections (marked with arrow 700) which are weak on the initial simulated data (FIG. 7A) but strong on the actual seismic data (FIG. 7C), are enhanced after 10 iterations of the CLSRTM method (FIG. 7B). This demonstrates that the novel CLSRTM method, based on the cross-correlation objective function, works better than existing methods to match the seismic data by updating the reflectivity model.

For the same synthetic example, FIGS. 8A-C illustrate the initial RTM image (FIG. 8A), the inverted image after 10 iterations of the CLSRTM method using migration velocity (FIG. 8B), and using stratigraphic velocity (FIG. 8C). The sedimentary structure on the left of the image is much sharper because of the deghosting effect intrinsically built into the CLSRTM method, while the subsalt structures are enhanced to give a better overall amplitude balance. The equally-spaced diffractors artificially put into the velocity model also provide references that the focusing in the inverted image is improved.

Some artifacts are observed in the sediments above the salt after applying the CLSRTM method. Using the (exact) stratigraphic velocity in the imaging operator of the CLSRTM method results in improved image quality in FIG. 8C for the $10^{th}$ iteration, and the migration artifacts above the salt are reduced. A close comparison shows the structures and diffractors in the subsalt area are also better focused using the correct velocity. These figures suggest that, although CLSRTM can tolerate a certain amount of velocity inaccuracy, a good velocity model is still desirable to unlock the structures, especially when geology is complicated.

Figures 9A, 9B:
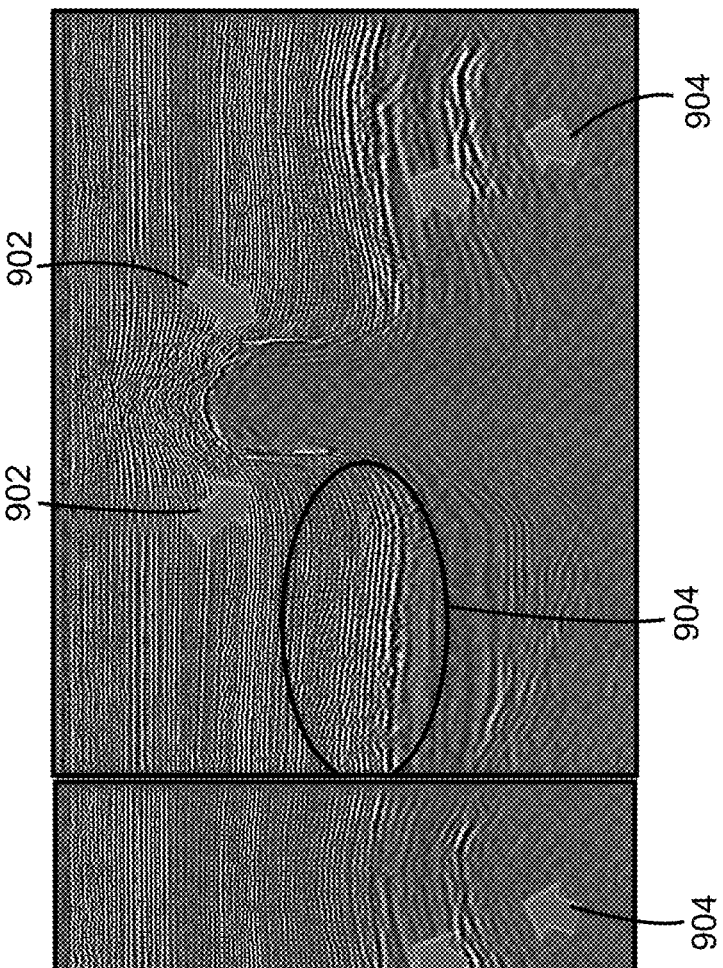
FIG. 9A illustrates an image of a surveyed subsurface using the RTM algorithm.
FIG. 9B illustrates the same subsurface using the correlative least-squares RTM.

A third and final example is illustrated in FIGS. 9A-B. Real seismic data from the central North Sea is illustrated in these examples. The seismic data has been bandpass filtered from 5 Hz to 45 Hz, and regularized to a 50 m by 50 m receiver grid. The migration model is TTI (Tilted Transverse Isotropy). Using the CLSRTM method, it is assumed that the source signature is unknown for both imaging and modeling and, by default, a source as a bandlimited flat spectrum wavelet is introduced. In the initial RTM image illustrated in FIG. 9A, a salt dome 900 is presented in the center, but its steeply dipping flanks 902 are weakly imaged. After 9 iterations of the CLSRTM method, illumination of the image near the salt dome boundary is enhanced as illustrated in FIG. 9B, showing strong energy on the nearly-vertical salt flanks and the termination structures, compared with the initial image. In addition, illumination of the chalk section 904 on either side of the salt in the inverted image is improved. In many places, the structures become more continuous. Overall, the inverted image using the CLSRTM method is amplitude-balanced with improved continuity and reveals more detailed structures.

Based on the above-discussed examples, least-squares migration is an attractive technique for improving image resolution and illumination, and suppressing migration artifacts. By using a cross-correlation objective function, the CLSRTM method provides stable solutions even when the source signature is unknown. Because RTDM can simulate data with free surface boundary conditions for any acquisition, the CLSRTM method is capable of handling some of the difficult imaging issues caused by acquisition, such as free surface ghosts for towed streamers and crosstalk caused by simultaneous shooting.

Figure 10:
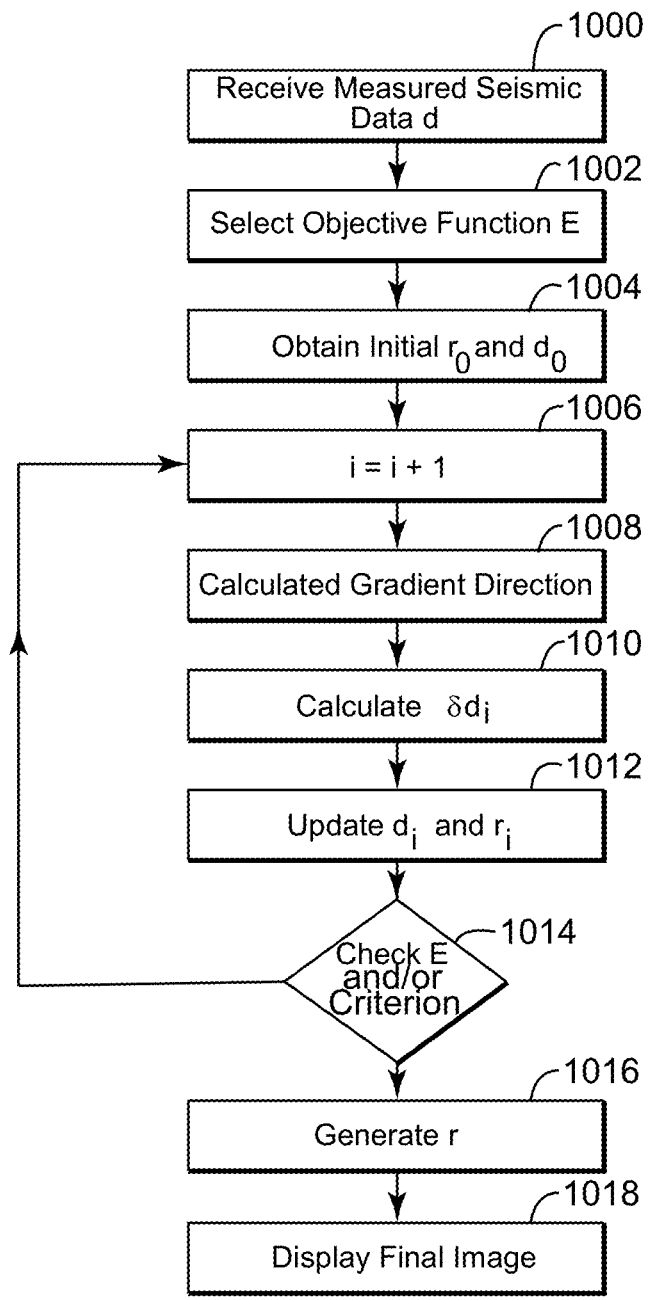
FIG. 10 is a flowchart illustrating the correlative least-squares RTM.

The novel methods discussed above may be implemented, in one embodiment, as now illustrated in FIG. 10. An objective of the process now described is to find the optimal image r that maximizes the cross-correlation between measured seismic data d and simulated data Mr at zero lag. Thus, in step 1000, measured seismic data d is received at a computing device for processing. An objective function E, for example, the one defined in equation (6), is selected in step 1002. Note that another objective function E may be selected that describes a cross-correlation between the measured seismic data d and simulated data. In other words, objective function E is a function of image r, which is mathematically expressed as E(r). In the same step, a gradient and hessian of the objective function may be calculated if a Newton method is applied for calculating optimal image r. Other mathematical methods may be selected to calculate optimal image r as will be appreciated by those skilled in the art.

In step 1004, an initial reflectivity image $r_0$ and initial simulated data $d_0=Mr_0$ are assumed to be known, where M is the modeling operator from the RTDM. In one application, initial reflectivity image $r_0$ and initial simulated data $d_0$ may be calculated using the RTM algorithm. Other algorithms may be used to calculate these initial quantities. Having these initial quantities, the process advances to step 1006, where an iteration index is updated for each iteration. For each iteration, the process advances to step 1008 for calculating a gradient direction in the image domain $\delta r_i$, where $\delta r_i$ is given by equation (10).

In step 1010, the modeling operator M of the RTDM process is applied to gradient direction $\delta r_1$ to obtain equation (11). In step 1012, a Newton update is performed on the simulated seismic data using equation (12) and inverted image using equation (13).

For updating the simulated seismic data d and inverted image r, scalar α is found by maximizing objective function E selected in step 1002, for example, using a linear searching method. In step 1014 objective function E is checked and a stopping criterion (e.g., E<−0.9) is verified. Note that other stopping criterion may be used, depending on the survey, its goals, the structure of the subsurface, etc. If the stopping criterion is not satisfied, the process returns to step 1006 to perform another iteration. However, if the condition is satisfied, the process generates the optimal image r in step 1016. Based on this, a final image of the surveyed subsurface may be displayed in step 1018.

Figure 11:
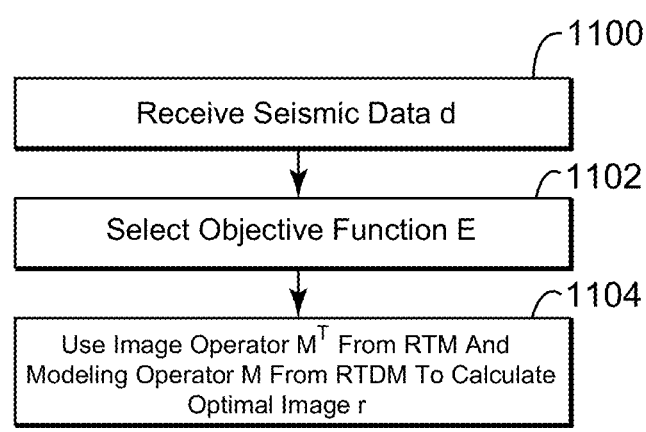
FIG. 11 is another flowchart illustrating the correlative least-squares RTM.

The process discussed above with regard to FIG. 10 provides many details for implementing the novel methods in a given computing device. The same process may also be expressed, as now discussed with regard to FIG. 11, with less detail so as not to obscure some of the novel features. In step 1100, measured seismic data d is received. The measured seismic data may be supplemented with observed seismic data d, initial reflectivity image $r_0$ and initial simulated data $d_0$. In step 1102, an objective function E is selected that reflects a cross-correlation between the measured seismic data d and the simulated data. In step 1104, an optimal image r is calculated by using the image operator from RTM and the modeling operator from RTDM to maximize/minimize objective function E.

The above embodiments were discussed without specifying what type of seismic receivers is used to record the seismic data. In this sense, it is known in the art to use, for a marine seismic survey, streamers that include seismic receivers, which are towed by one or more vessels. The streamers may be horizontal, slanted or have a curved profile as illustrated in FIG. 12.

Figure 12:
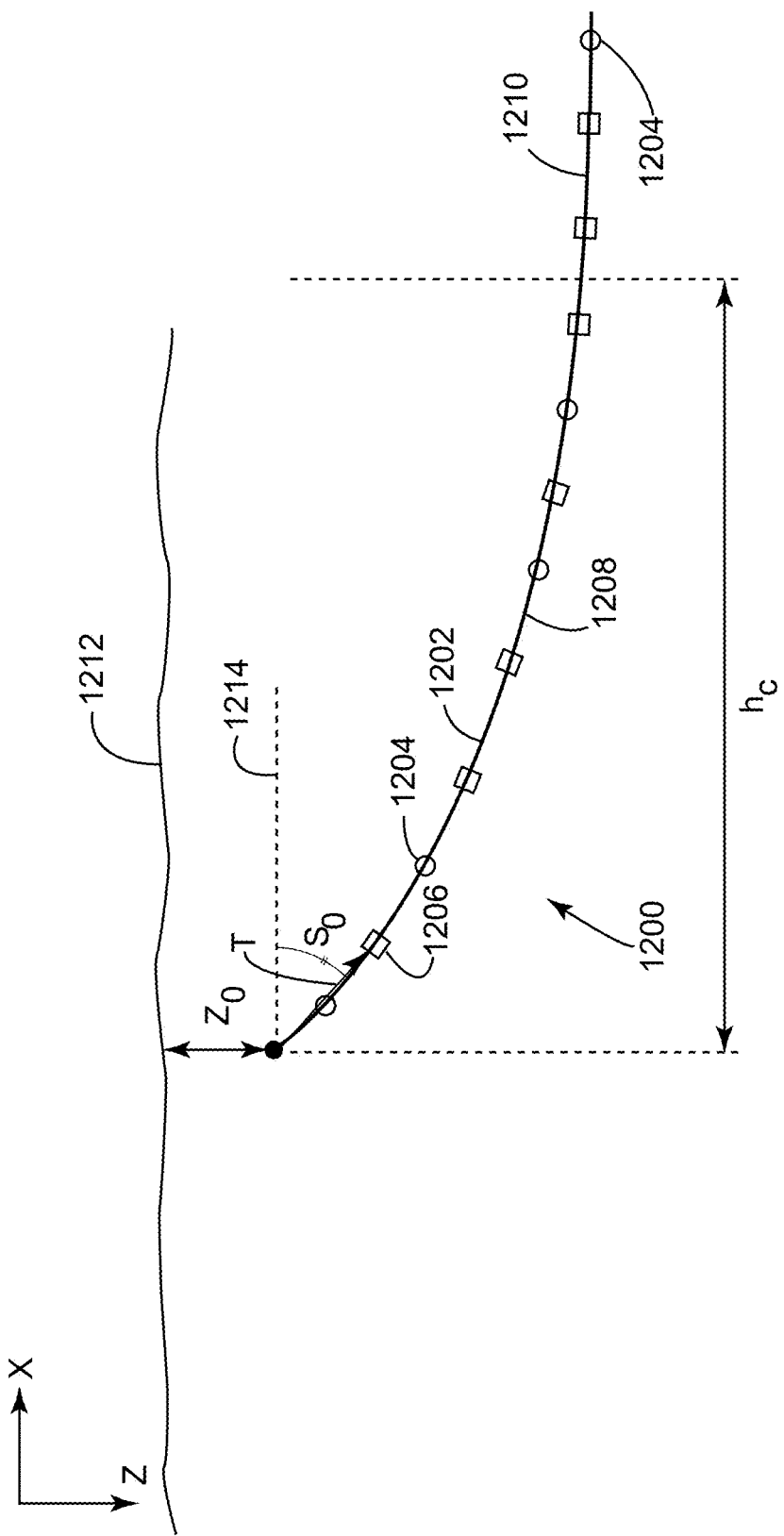
FIG. 12 is a schematic diagram of a curved streamer.

The curved streamer 1200 of FIG. 12 includes a body 1202 having a predetermined length, plural detectors 1204 provided along the body, and plural birds 1206 provided along the body to maintain the selected curved profile. The streamer is configured to flow underwater when towed such that the plural detectors are distributed along the curved profile. The curved profile may be described as a parameterized curve, e.g., a curve described by (i) a depth z0 of a first detector (measured from the water surface 1212), (ii) a slope s0 of a first portion T of the body with an axis 1214 parallel with the water surface 1212, and (iii) a predetermined horizontal distance hc between the first detector and an end of the curved profile. Note that not the entire streamer has to have the curved profile. In other words, the curved profile should not be construed to always apply to the entire length of the streamer. While this situation is possible, the curved profile may be applied only to a portion 1208 of the streamer. In other words, the streamer may have (i) only a portion 1208 having the curved profile or (ii) a portion 1208 having the curved profile and a portion 1210 having a flat profile, with the two portions attached to each other.

Figure 13:
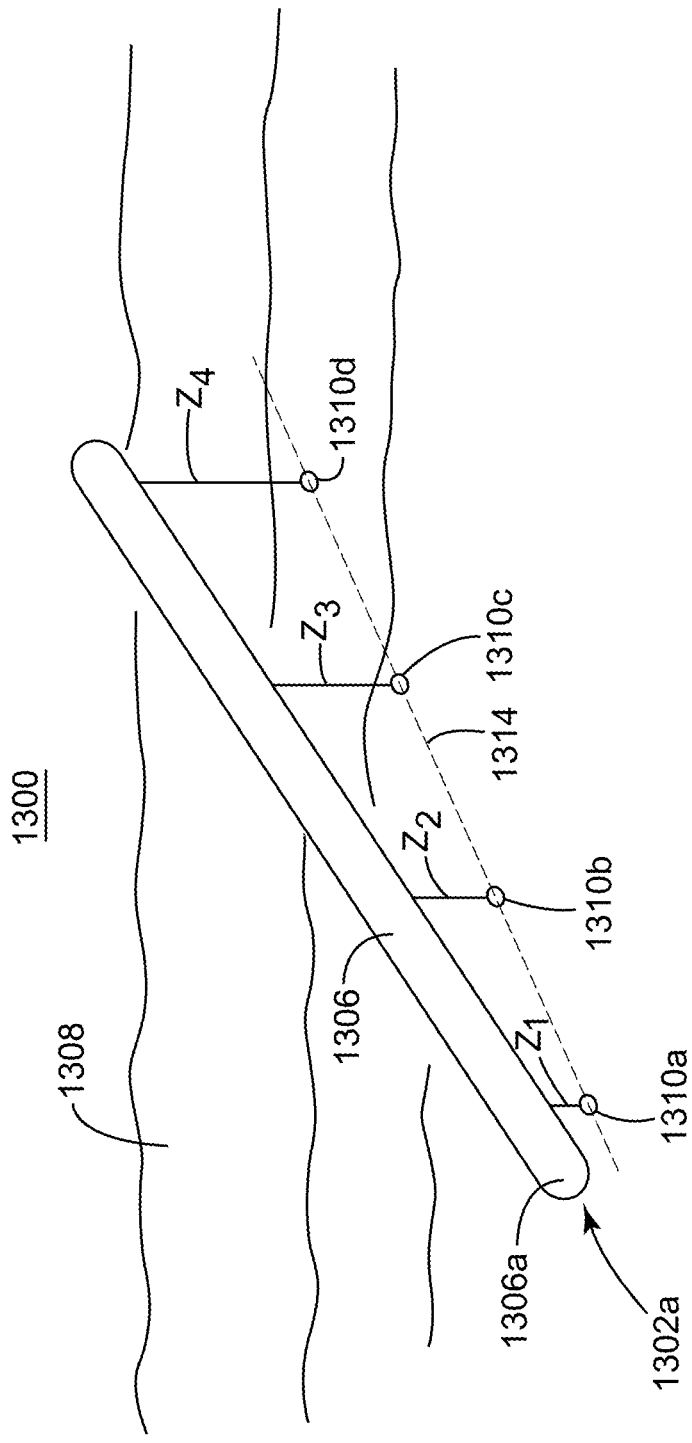
FIG. 13 is a schematic diagram of a multi-component source.

Further, the above embodiments may be used with a multi-level source. A multi-level source 1300 has one or more sub-arrays. The first sub-array 1302 has a float 1306 configured to float at the water surface 1308 or underwater at a predetermined depth. Plural source points 1310a-d are suspended from the float 1306 in a known manner. A first source point 1310a may be suspended closest to the head 1306a of float 1306, at a first depth z1. A second source point 1310b may be suspended next, at a second depth z2, different from z1. A third source point 1310c may be suspended next, at a third depth z3, different from z1 and z2, and so on. FIG. 13 shows, for simplicity, only four source points 1310a-d, but an actual implementation may have any desired number of source points. In one application, because the source points are distributed at different depths, these source points are not simultaneously activated. In other words, the source array is synchronized, i.e., a deeper source point is activated later in time (e.g., 2 ms for 3 m depth difference when the speed of sound in water is 1,500 m/s) such that corresponding sound signals produced by the plural source points coalesce and, thus, the overall sound signal produced by the source array appears to be a single sound signal.

Depths z1 to z4 of the source points of the first sub-array 1302 may obey various relationships. In one application, the source points' depths increase from the head toward the tail of the float, i.e., z1<z2<z3<z4. In another application, the source points' depths decrease from the head to the tail of the float. In another application, the source points are slanted, i.e., provided on an imaginary line 1314. In still another application, line 1314 is straight. In yet another application, line 1314 is curved, e.g., part of a parabola, circle, hyperbola, etc. In one application, the depth of the first source point for sub-array 1302 is about 5 m and the greatest depth of the last source point is about 8 m. In a variation of this embodiment, the depth range is between 8.5 and 10.5 m or between 11 and 14 m. In another variation of this embodiment, when line 1314 is straight, the source points's depths increase by 0.5 m from one source point to an adjacent source point. Those skilled in the art would recognize that these ranges are exemplary and these numbers may vary from survey to survey. A common feature of all these embodiments is that the source points have variable depths so a single sub-array exhibits multiple-level source points.

Figure 14:
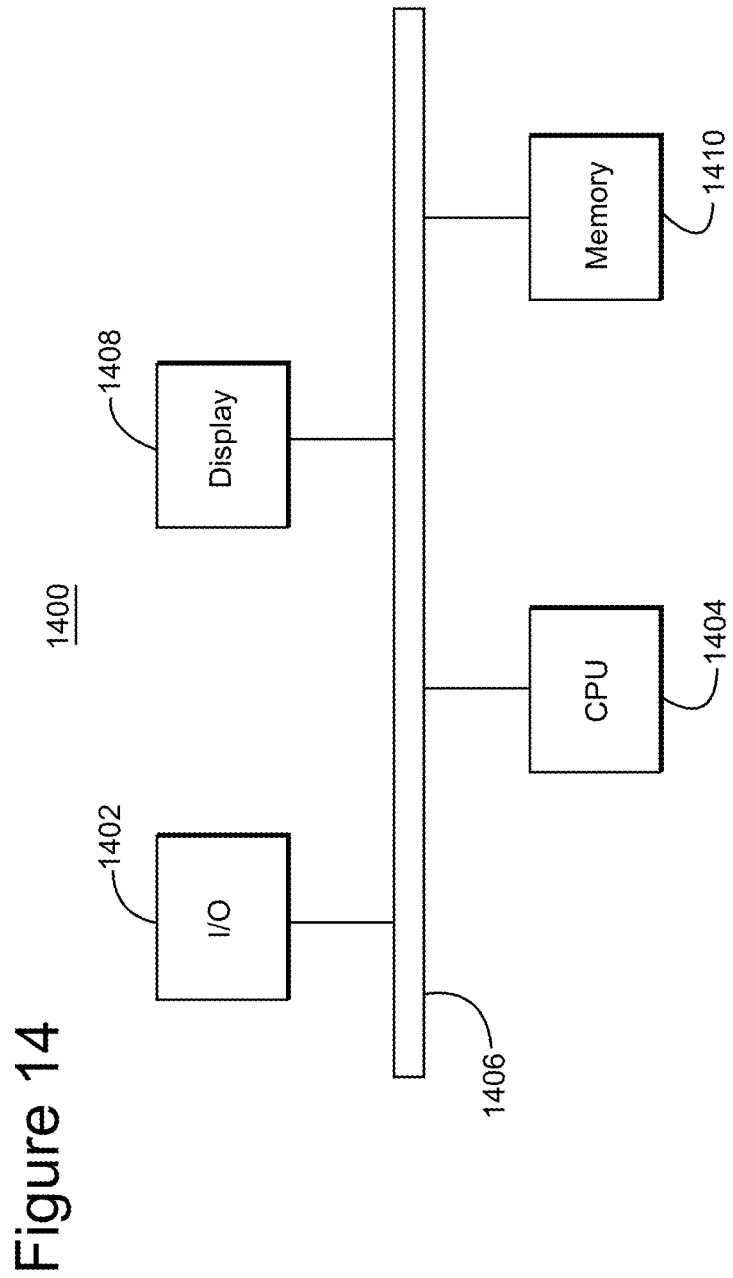
FIG. 14 is a schematic diagram of a computing device.

The above-discussed method may be implemented, in an embodiment, in a processing apparatus 1400 as illustrated in FIG. 14. Processing device 1400 may be specifically configured to calculate an optimal image r for use in generating a final image of a subsurface of the earth. Processing device 1400 may be, for example, a computer, a processor, a server, or a network of computers, processors or servers. Processing device 1400 may include an interface 1402 configured to receive data from outside, e.g., seismic data. Interface 1402 may accommodate an Internet connection, satellite connection, keyboards, etc. Processing device 1400 also includes a processor 1404 connected to interface 1402 through a bus 1406 and configured to execute one or more or all of the steps discussed with regard to FIGS. 2, 10 and 11. Processing device 1400 may have dedicated circuitry for each step of FIGS. 2, 10 and 11 or processor 1404 may be configured with software to execute all the steps shown in these figures. Processing device 1400 may also include a display 1408 for displaying a final image calculated by processor 1404. Various data used for calculating the final image may be stored in a storage device 1410 connected to processor 1404. Other known components of a computer, server or processor may also be present.

The disclosed exemplary embodiments provide a system and a method for processing, with fast convergence, data related to a subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating a final image of a subsurface of the earth, the method comprising:
   receiving measured seismic data d of the subsurface;
   applying with a processor a modeling operator M, from a reverse time demigration (RTDM) process, on a reflectivity r of the subsurface to obtain simulated data $\tilde{d}$;
   selecting an objective function E that is function of the reflectivity r of the subsurface, wherein the objective function E includes a term that cross-correlates the measured seismic data d and the simulated data $\tilde{d}$ at zero lag, wherein the objective function E is unchanged when the simulated data $\tilde{d}$ is rescaled;
   calculating with the processor the reflectivity r of the subsurface based on the measured seismic data d, the objective function E, and the simulated data $\tilde{d}$; and
   generating the final image of the subsurface based on the reflectivity r of the subsurface,
   wherein the step of calculating further includes,
   calculating a gradient of the objective function,
   calculating a hessian of the objective function,
   receiving an initial reflectivity $r_0$ and an initial simulated data $d_0$, and
   calculating a gradient direction $\delta r_i$ in an image domain, wherein the gradient direction $\delta r_i$ is given by applying a reverse time migration (RTM) imaging operator $M^T$ to a matrix including an inverse of the hessian and the gradient of the objective function.

2. The method of claim 1, wherein the objective function E relaxes an amplitude matching condition and determines a closeness between the simulated data $\tilde{d}$ and the measured seismic data d.

3. The method of claim 1, wherein the objective function E is given by:

$$E(r) = -\int\int\int \frac{Mr \cdot d}{\sqrt{\int (Mr)^2 dt} \sqrt{\int d^2 dt}} dt d\hat{x}_s d\hat{x}_r,$$

where M is a modeling operator from reverse time demigration (RTDM) process, Mr is the modeled seismic data, $x_r$ is a position of a receiver recording the seismic data, $x_s$ is a position of a source generating seismic waves, and t is the time.

4. The method of claim 1, further comprising:
applying the modeling operator M from the reverse time demigration (RTDM) process to the gradient direction $\delta r_i$ to obtain $\delta d_i$.

5. The method of claim 4, further comprising:
applying a Newton method for updating the simulated seismic data based on equation $d_i = d_{i-1} - \alpha \cdot \delta d_i$ and the reflectivity based on equation $r_i = r_{i-1} - \alpha \cdot \delta r_i$, where "i" is an iteration index, and $\alpha$ is a scalar.

6. The method of claim 5, wherein the scalar $\alpha$ is determined by minimizing the objective function E.

7. A method for generating a final image of a subsurface of the earth, the method comprising:
receiving measured seismic data d of the subsurface;
applying with a processor a modeling operator M, from a reverse time demigration (RTDM) process, on a reflectivity r of the subsurface to obtain simulated data $\tilde{d}$;
selecting an objective function E that is function of the reflectivity r of the subsurface, wherein the objective function E includes a term that cross-correlates the measured seismic data d and the simulated data $\tilde{d}$ at zero lag, wherein the objective function E is unchanged when the simulated data $\tilde{d}$ is rescaled;
calculating, in the processor, the reflectivity r based on the measured seismic data d, the objective function E, the simulated data $\tilde{d}$, the modeling operator M from the reverse time demigration (RTDM) process and an imaging operator $M^T$ from a reverse time migration (RTM) process; and
generating the final image of the subsurface, based on the reflectivity r of the subsurface,
wherein the objective function E is given by:

$$E(r) = -\int\int\int \frac{Mr \cdot d}{\sqrt{\int (Mr)^2 dt}\sqrt{\int d^2 dt}} dt d\hat{x}_s d\hat{x}_r,$$

where Mr is the modeled seismic data, $x_r$ is a position of a receiver recording the seismic data, $x_s$ is a position of a source generating seismic waves, and t is the time.

8. The method of claim 7, wherein the objective function E relaxes an amplitude matching condition and determine a closeness between the simulated data $\tilde{d}$ and the measured seismic data d.

9. The method of claim 7, wherein the step of calculating further comprises:
calculating a gradient of the objective function;
calculating a hessian of the objective function;
receiving an initial reflectivity $r_0$ and an initial simulated data $d_0$;
calculating a gradient direction in an image domain $\delta r_i$, wherein the gradient direction $\delta r_i$ is given by applying the imaging operator $M^T$ to a matrix including an inverse of the hessian and the gradient of the objective function.

10. The method of claim 9, further comprising:
applying the modeling operator M to the gradient direction $\delta r_i$ to obtain $\delta d_i$; and
applying a Newton method for updating the simulated seismic data based on equation $d_i = d_{i-1} - \alpha \cdot \delta d_i$ and the reflectivity based on equation $r_i = r_{i-1} \alpha \cdot \delta r_i$, where "i" is an iteration index, and $\alpha$ is a scalar,
wherein the scalar $\alpha$ is determined by minimizing the objective function E.

11. A method for generating a final image of a subsurface of the earth, the method comprising:
receiving measured seismic data d of the subsurface;
applying with a processor a modeling operator M, from a reverse time demigration (RTDM) process, on a reflectivity r of the subsurface to obtain simulated data $\tilde{d}$;
selecting an objective function E that is function of the reflectivity r of the subsurface, wherein the objective function E is unchanged when the simulated data $\tilde{d}$ is rescaled;
calculating, in the processor, the reflectivity r based on the measured seismic data d, the objective function E, the simulated data $\tilde{d}$, the modeling operator M from the reverse time demigration (RTDM) process and an imaging operator $M^T$ from a reverse time migration (RTM) process; and
generating the final image of the subsurface based on the reflectivity r of the subsurface,
wherein the step of calculating further comprises:
calculating a gradient of the objective function,
calculating a hessian of the objective function,
receiving an initial reflectivity $r_0$ and an initial simulated data $d_0$,
calculating a gradient direction $\delta r_i$ in an image domain, wherein the gradient direction $\delta r_i$ is given by applying the imaging operator $M^T$ to a matrix including an inverse of the hessian and the gradient of the objective function,
applying the modeling operator M to the gradient direction $\delta r_i$ to obtain $\delta d_i$, and
applying a Newton method for updating the simulated seismic data based on equation $d_i = d_{i-1} \alpha \cdot \delta d_i$ and the reflectivity based on equation $r_i = r_{i-1} \alpha \cdot \delta r_i$, where "i" is an iteration index, and $\alpha$ is a scalar,
wherein the scalar $\alpha$ is determined by minimizing the objective function E.

12. The method of claim 11, wherein the objective function E relaxes an amplitude matching condition and uses phase information to determine a closeness between the simulated data $\tilde{d}$ and the measured seismic data d.

13. The method of claim 11, wherein the objective function E is given by:

$$E(r) = -\int\int\int \frac{Mr \cdot d}{\sqrt{\int (Mr)^2 dt}\sqrt{\int d^2 dt}} dt d\hat{x}_s d\hat{x}_r,$$

where Mr is the modeled seismic data, $x_r$ is a position of a receiver recording the seismic data, $x_s$ is a position of a source generating seismic waves, and t is the time.

* * * * *